United States Patent
Murakami et al.

(10) Patent No.: US 10,931,197 B2
(45) Date of Patent: Feb. 23, 2021

(54) POWER CONVERSION DEVICE OF MOTOR VEHICLES

(71) Applicant: DENSO CORPORATION, Kariya (JP)

(72) Inventors: Tatsuya Murakami, Kariya (JP); Yuu Yamahira, Kariya (JP); Kengo Mochiki, Kariya (JP)

(73) Assignee: DENSO CORPORATION, Kariya (JP)

( * ) Notice: Subject to any disclaimer, the term of this patent is extended or adjusted under 35 U.S.C. 154(b) by 9 days.

(21) Appl. No.: 16/537,660

(22) Filed: Aug. 12, 2019

(65) Prior Publication Data
US 2020/0052589 A1 Feb. 13, 2020

(30) Foreign Application Priority Data

Aug. 10, 2018 (JP) .............................. JP2018-151314

(51) Int. Cl.
| | | |
|---|---|---|
| H02P 1/00 | (2006.01) | |
| H02P 1/28 | (2006.01) | |
| H02P 3/00 | (2006.01) | |
| H02P 7/06 | (2006.01) | |
| H02M 3/158 | (2006.01) | |
| H02P 27/06 | (2006.01) | |
| H02M 1/08 | (2006.01) | |
| B60K 6/22 | (2007.10) | |
| B60L 50/50 | (2019.01) | |

(52) U.S. Cl.
CPC ............ *H02M 3/158* (2013.01); *H02M 1/08* (2013.01); *H02P 27/06* (2013.01); *B60K 6/22* (2013.01); *B60L 50/50* (2019.02); *B60L 2210/10* (2013.01); *B60Y 2200/91* (2013.01); *B60Y 2200/92* (2013.01); *B60Y 2400/61* (2013.01)

(58) Field of Classification Search
CPC .......... H02M 3/158; H02M 1/08; H02P 27/06
USPC ....................................................... 318/504
See application file for complete search history.

(56) References Cited

U.S. PATENT DOCUMENTS

| | | | |
|---|---|---|---|
| 2012/0313614 A1 | 12/2012 | Ohshita et al. | |
| 2015/0318793 A1* | 11/2015 | Kobayashi ............ | H02M 7/537 363/97 |
| 2017/0222641 A1* | 8/2017 | Zou .................... | H02M 7/53875 |
| 2017/0302181 A1 | 10/2017 | Shimizu et al. | |
| 2018/0145683 A1* | 5/2018 | Shimizu ................ | H03K 17/06 |
| 2018/0361865 A1* | 12/2018 | Bando .................... | B60L 53/60 |

(Continued)

FOREIGN PATENT DOCUMENTS

JP 2019-146411 A 8/2019

*Primary Examiner* — Erick D Glass
(74) *Attorney, Agent, or Firm* — Oliff PLC

(57) ABSTRACT

A power conversion device, mounted on a motor vehicle, has a battery, a power converter, a reactor and a control unit. The power conversion device boosts a battery voltage of the battery, and supplies a boosted voltage to a motor generator mounted on a motor vehicle. The power conversion device transmits electric power generated by the motor generator and supplies the generated electric power to the battery through the power converter. The power converter has an upper arm and a lower arm. The upper arm has upper arm side switching elements. The lower arm has lower arm side switching elements which are directly connected to the respective upper arm side switching elements. At least one of the upper arm side switching elements is composed of a MOS FET and at least one of the lower arm side switching elements is composed of an IGBT.

18 Claims, 10 Drawing Sheets

(56) References Cited

U.S. PATENT DOCUMENTS

| | | | |
|---|---|---|---|
| 2020/0052589 A1* | 2/2020 | Murakami | H02P 27/06 |
| 2020/0083731 A1* | 3/2020 | Sone | H02J 7/342 |

* cited by examiner

POWER CONVERSION DEVICE OF MOTOR VEHICLES

CROSS-REFERENCE TO RELATED APPLICATION

This application is related to and claims priority from Japanese Patent Application No. 2018-151314 filed on Aug. 10, 2018, the contents of which are hereby incorporated by reference.

TECHNICAL FIELD

The present disclosure relates to power conversion devices of motor vehicles.

BACKGROUND

For example, a related art provides a switching power supply circuit as a power conversion device of a motor vehicle. The power switching circuit has a plurality of booster circuits. Each of the booster circuits has a reactor, a diode and a switching element. In the switching power supply circuit, at least some of the reactors, and some of the switching elements have different characteristics.

The power conversion device according to the related art has a power converter composed of upper arm side switching elements and lower arm side switching elements. The power converter boosts a voltage supplied from a battery. In general, the related art uses metal oxide semiconductor field effect transistors (MOS FETs) as the upper arm side switching elements and the lower arm side switching elements. However, such a related art causes a power conversion loss in a large current region.

SUMMARY

It is desired for the present disclosure to provide a power conversion device of motor vehicles. The power conversion device has a power converter which boosts a battery voltage supplied from a battery and supplies the boosted voltage to a motor mounted on a motor vehicle. The power converter has an upper arm and a lower arm. The upper arm has a plurality of upper arm side switching elements. The lower arm has a plurality of lower arm side switching elements. The plurality of upper arm side switching elements are directly connected to the respective plurality of lower arm side switching elements. At least one of the plurality of upper arm side switching elements is composed of a metal oxide semiconductor field effect transistor (MOS FET). Further, at least one of the plurality of lower arm side switching elements is composed of an insulated gate bipolar transistor (IGBT).

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Figure 1:
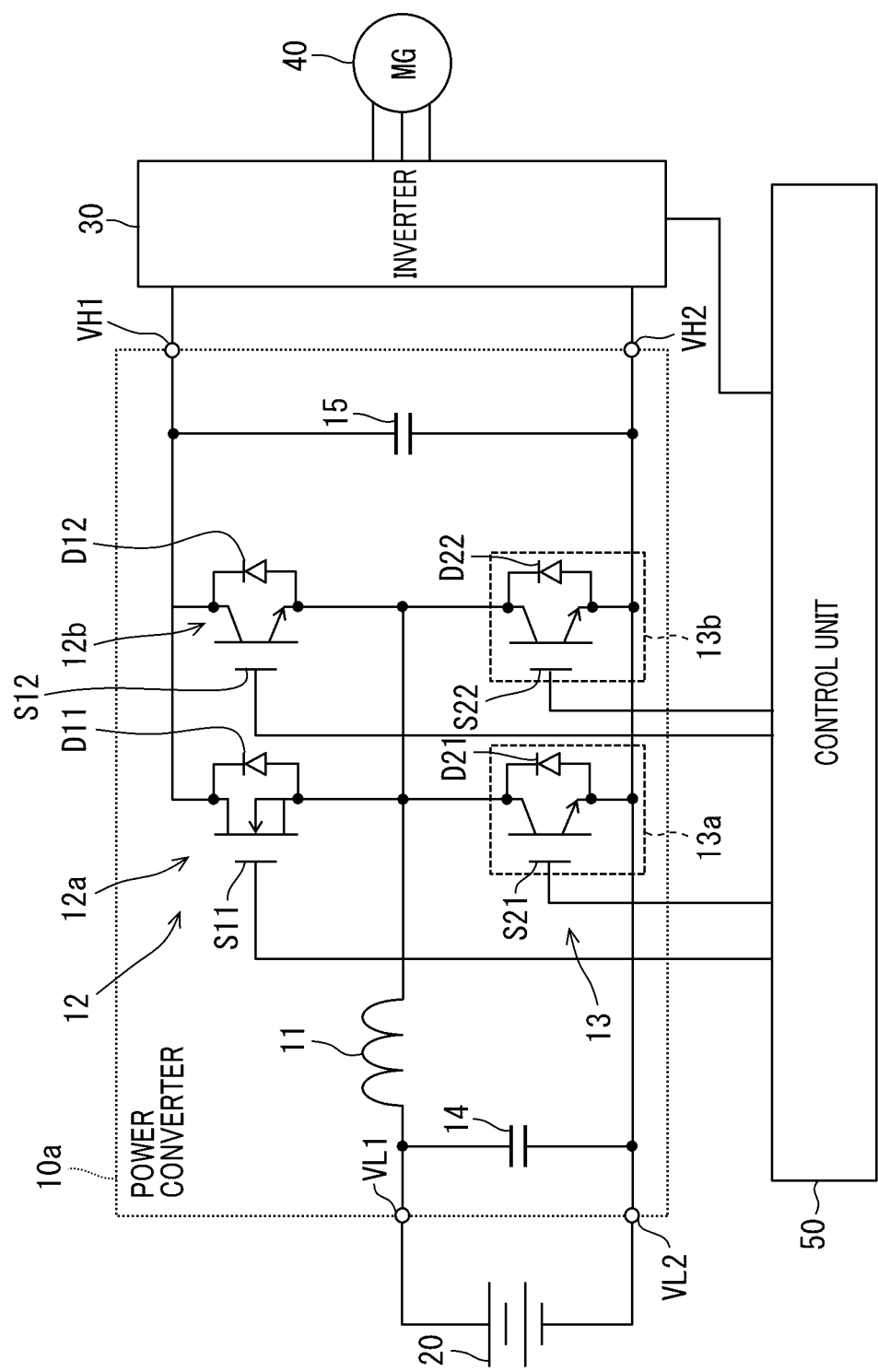
FIG. 1 is a view showing a schematic structure of a power converter in a power conversion device according to a first exemplary embodiment of the present disclosure.

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of the power conversion device according to a first exemplary embodiment with reference to FIG. 1, FIG. 2 and FIG. 3.

FIG. 1 is a view showing a schematic structure of a power converter 10a in the power conversion device according to the first exemplary embodiment. As shown in FIG. 1, the power conversion device has the power converter 10a according to the first exemplary embodiment. The power conversion device equipped with the power converter 10a is mounted on a motor vehicle (not shown). That is, the power converter 10a can be applied to motor vehicles such as electric vehicles, hybrid vehicles, etc. The power converter 10a will also be referred to as the in-vehicle power converter. It is acceptable to refer the power converter 10a with an in-vehicle power converter, or with an electric power conversion device for motor vehicles.

As shown in FIG. 1, the power converter 10a is connected to a battery 20, an inverter 30 and a control unit 50. In more detail, as shown in FIG. 1, the power converter 10a has input terminals VL1 and VL2 and output terminals VH1 and VH2. The power converter 10a is electrically connected to the battery 20 through the input terminals VL1 and VL2. Further, the power converter 10a is electrically connected to the inverter 30 through the output terminals VH1 and VH2.

It is acceptable for the power conversion device according to the first exemplary embodiment to have the inverter 30 therein. In the power conversion device according to the first exemplary embodiment, it is acceptable to assemble the power converter 10a and the inverter 30 together. In a concrete example, the power converter 10a and the inverter 30 are covered with a casing.

In the structure of the power conversion device according to the first exemplary embodiment, the power converter 10a operates under a voltage reduction mode (or a low voltage boost mode) and a non-voltage boost mode in addition to a voltage boost mode. For example, during the voltage boosting mode, the power converter 10a boosts a direct current voltage (DC voltage) of the battery 20 as a DC power source, and supplies the boosted voltage to the inverter 30.

As will be explained later in detail, the inverter 30 is electrically connected to a motor generator (MG) 40. Accordingly, the power converter 10a boosts the DC voltage of the battery 20 and supplies the boosted voltage to the motor generator 40 through the inverter 30.

In the voltage reduction mode, the power converter 10a reduces the DC voltage supplied from the inverter 30, and supplies the reduced voltage to the battery 20. That is, the motor generator 40 generates an alternating current voltage (AC voltage) as regenerative power, and the inverter 30 converts the AC voltage to a DC voltage. The power converter 10a reduces the DC voltage supplied from the inverter 30, and supplies the reduced DC voltage to the battery 20. The AC voltage is generated by the motor generator 40 and the generated AC voltage is supplied to the inverter 30.

It is acceptable to use a rechargeable battery as a secondary battery so as to accumulate the electrical energy generated by the motor generator 40. For example, it is acceptable to use a plurality of battery cells connected in series as the battery 20.

The inverter 30 is electrically connected to the motor generator 40. The inverter 30 converts a boosted DC power to an AC power. That is, the inverter 30 converts the DC voltage boosted by the power converter 10a to an AC voltage (three phase AC voltage), and supplies the three phase AC voltage to the motor generator 40 so as to drive the motor generator 40.

A motor vehicle on a motor vehicle is driven by the AC voltage supplied from the power conversion device having the power converter 10a and the inverter 30.

The motor generator 40 will be also referred to as a motor. The motor generator 40 is used as a driving power source to drive a motor vehicle, and also used as an alternator generating a regenerative energy from a rotational kinetic energy from the wheels when the driver of the motor vehicle depresses the brake pedal, and releases the acceleration pedal.

As shown in FIG. 1, the control unit 50 controls the behavior of a first upper arm side switching part S11, a second upper arm side switching part S12, a first lower arm side switching element S21 and a second lower arm side switching part S22.

A description will now be given of the structure and behavior of the power converter 10a. As shown in FIG. 1, the power converter 10a has a reactor 11, an upper arm 12, a lower arm 13, a noise suppression capacitor 14, a smoothing capacitor 15, etc.

It is acceptable to eliminate the noise suppression capacitor 14 and the smoothing capacitor 15 from the structure of the power converter 10a. That is, it is acceptable for the power conversion device according to the first exemplary embodiment to not always have the noise suppression capacitor 14 and the smoothing capacitor 15.

Further, further, the power conversion device according to the first exemplary embodiment has a structure in which the reactor 11, the upper arm 12, the lower arm 13, the noise suppression capacitor 14, the smoothing capacitor 15 and the inverter 30 are assembled together as one unit.

Still further, the power conversion device according to the first exemplary embodiment has a structure in which the reactor 11, the upper arm 12, the lower arm 13 and the inverter 30 are assembled together as one body, without the noise suppression capacitor 14 and the smoothing capacitor 15.

As shown in FIG. 1, one terminal of the reactor 11 is connected to the battery 20, and the other terminal thereof is electrically connected to a connection node between the upper arm 12 and the lower arm 13. In more detail, the other terminal of the reactor 12 is electrically connected to the first upper arm side switching part S11, the second upper arm side switching part S12, the first lower arm side switching element S21 and the second lower arm side switching part S22 through the connection node.

The reactor 11 is configured to accumulate and supply electrical energy.

The upper arm 12 has a first upper arm side switching element 12a and a second upper arm side switching element 12b.

In the structure of the power converter 10a according to the first exemplary embodiment, the first upper arm side switching element 12a has the first upper arm side switching part S11 and a first upper side diode D11 as a freewheel diode. The first upper arm side switching element 12a uses a metal oxide semiconductor field effect transistor (MOS FET). That is, as shown in FIG. 1, the first upper arm side switching element 12a is composed of the MOS FET as the first upper arm side switching part S11 and the first upper side diode D11. This first upper side diode D11 is a parasitic diode of the MOS FET. Accordingly, it is possible for the first upper arm side switching element 12a to not have any additional freewheel diode because the MOS FET has the first upper side diode as a parasitic diode.

As shown in FIG. 1, a drain of the first upper arm side switching part S11 is connected to a high voltage line, and a source of the first upper arm side switching part S11 is connected to a collector of the first lower arm side switching element S21. A gate of the first upper arm side switching part S11 is connected to the control unit 50. It is possible to use a MOS FET made of Si, SiC, or GaN.

In the structure of the power converter 10a according to the first exemplary embodiment, the second upper arm side switching element 12b has the second upper arm side switching part S12 and a second upper arm side diode D12 as a freewheel diode. The second upper arm side switching element 12a uses an insulated gate bipolar transistor (IGBT). That is, as shown in FIG. 1, the second upper arm side switching element 12b is composed of the IGBT as the second upper arm side switching part S12.

As shown in FIG. 1, a collector of the second upper arm side switching part S12 is connected to the high voltage line, and an emitter of the second upper arm side switching part S12 is connected to a collector of the second lower arm side switching element S22. A gate of the second upper arm side switching part S12 is connected to the control unit 50. It is possible to use a switching element made of Si as the second lower arm side switching element S22. It is possible to use a MOS FET or a reverse-conducting IGBT (RC-IGBT) as the second upper arm side switching element 12b.

As previously described, in the structure of the power converter 10a of the power conversion device according to the first exemplary embodiment, the upper arm 12 has the first upper arm side switching element 12a and the second upper arm side switching element 12b only, and at least one of the first upper arm side switching element 12a and the second upper arm side switching element 12b is composed of a MOS FET. In other words, the upper arm 12 has a plurality of switching elements and freewheel diodes which are arranged in parallel with the respective plurality of switching elements. Further, at least one of the plurality of switching elements is composed of a MOS FET. Accordingly, this structure makes it possible to reduce the total number of elements in the power converter 10a when compared with a case in which the first upper arm side switching part S11 is composed of other elements as the Schottky barrier diodes arranged in parallel with each other. That is, in the structure of the power converter 10a according to the first exemplary embodiment, the first upper arm side switching element 12a composed of a MOS FET is not connected in parallel with Schottky barrier diodes.

It is not necessary for each of the upper arm side switching elements to have a freewheel diode. For example, it is acceptable to use an IGBT without a freewheel diode as one of the upper arm side switching elements.

It is preferable that the number of the switching elements is equal or greater than the number of the diodes in the upper arm 12.

The power converter 10a according to the first exemplary embodiment, the power converter 10a has the upper arm 12 composed of the first upper arm side switching element 12a and the second upper arm side switching element 12b only. The concept of the present invention is not limited by this structure, it is acceptable for the upper arm 12 to have not less than three upper arm side switching elements.

As shown in FIG. 1, in the structure of the power converter 10a of the power conversion device according to the first exemplary embodiment, the lower arm 13 has a first lower arm side switching element 13a and a second lower arm side switching element 13b.

The first lower arm side switching element 13a has the first lower arm side switching element S21 and a first lower arm side diode D21 as a freewheel diode. Similarly, the second lower arm side switching element 13b has the second lower arm side switching element S22 and a second lower arm side diode D22 as a freewheel diode.

The first lower arm side switching element 13a and the second lower arm side switching element 13b have the same structure. Accordingly, the behavior of only the first lower arm side switching element 13a will be explained for brevity.

The first lower arm side switching element 13a is composed of an RC-IGBT. Accordingly, both the first lower arm side switching element 13a, the first lower arm side switching element S21 and the first lower arm side diode D21 as a freewheel diode are formed together in the same semiconductor chip. The first lower arm side switching element 13a does not have any freewheel diode as an additional element to be added to the first lower arm side switching element S21.

A collector of the first lower arm side switching element S21 is connected to a source of the first upper arm side switching part S11, an emitter of the first lower arm side switching element S21 is connected to the low voltage line, an d a gate of the first lower arm side switching element S21 is connected to the control unit 50.

Further, a collector of the second lower arm side switching element S22 is connected to an emitter of the second upper arm side switching part S12, and an emitter of the second lower arm side switching element S22 is connected to the low voltage line, and a gate of the second lower arm side switching element S22 is connected to the control unit 50.

That is, in the lower arm 13, the first lower arm side switching element S21 is connected in series to the first upper arm side switching part S11, and the second lower arm side switching element S22 is connected in series to the second upper arm side switching part S12.

Accordingly, the lower arm 13 is composed of a pair of IGBT as the first lower arm side switching element 13a and the second lower arm side switching element 13b, which are directly connected to the first upper arm side switching element 12a and the second upper arm side switching element 12b.

The power converter 10a has a plurality of pairs, i.e. the pairs composed of a first upper arm side switching element 12a and second upper arm side switching element 12b, and pairs of a first lower arm side switching element 13a and second lower arm side switching element 13b.

Both the first upper arm side switching element 12a and the second upper arm side switching element 12b are referred to as high voltage side elements. Similarly, both the first lower arm side switching element 13a and the second lower arm side switching element 13b are referred to as the low voltage side elements.

As shown in FIG. 1, one terminal of the noise suppression capacitor 14 is electrically connected to a connection node between the reactor 11 and the battery 20. The other terminal of the noise suppression capacitor 14 is electrically connected to ground. The noise suppression capacitor 14 suppresses or avoids noise generated in the battery 20.

The smoothing capacitor 15 is connected in parallel with a series connection unit composed of the upper arm 12 and the lower arm 13. The smoothing capacitor 15 smoothes the boosted voltage. That is, the smoothing capacitor 15 smoothes the voltage to be supplied to the inverter 30.

A description will now be given of the behavior of the power converter 10a during the voltage boost mode, the voltage reduction mode, and the non-voltage boost mode.

In the voltage boost mode, the control unit 50 turns off both the first upper arm side switching part S11 and the second upper arm side switching part S12, and turns on both the first lower arm side switching element S21 and the second lower arm side switching element S22. This control makes it possible to allow a current to flow from the battery 20 to the reactor 11. The reactor 11 accumulates electrical energy.

After the step, the control unit 50 turns on both the first upper arm side switching part S11 and the second upper arm side switching part S12, and turns off both the first lower arm side switching element S21 and the second lower arm side switching element S22. These steps allow the reactor 11 to supply the accumulated power energy, and allow a current to flow from the reactor 11 to the output terminal VH1 through the first upper arm side switching part S11, the second upper arm side switching part S12, the first upper side diode D11 and the second upper side diode D12. The control unit 50 repeatedly performs these steps.

Figure 2:
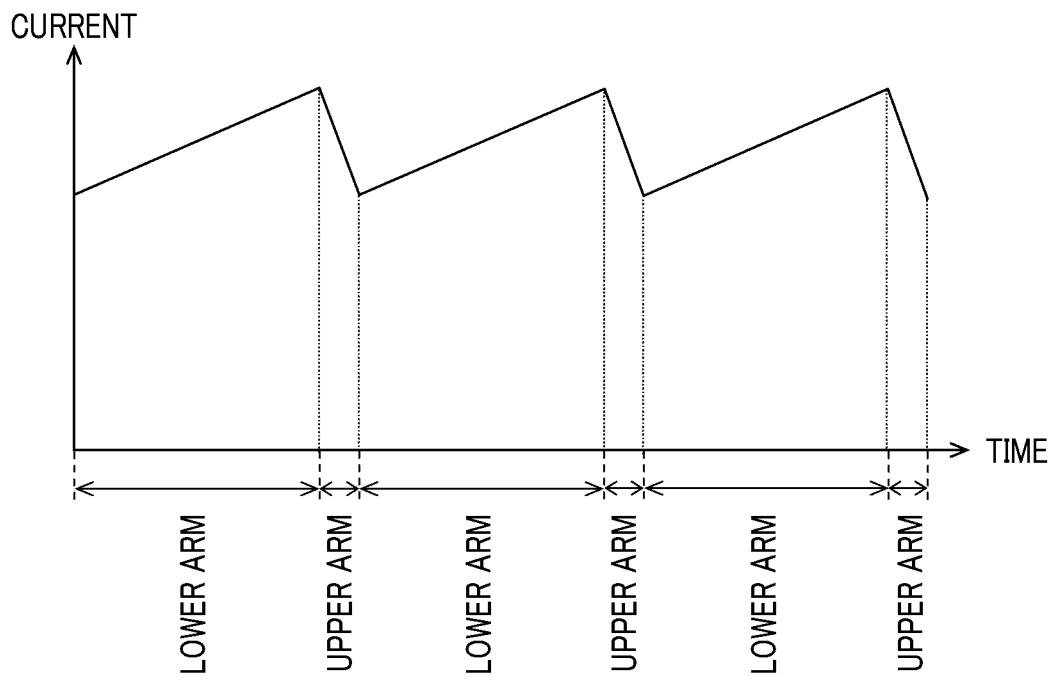
FIG. 2 is a timing chart showing a current waveform so as to explain a behavior of the power converter shown in FIG. 1.

FIG. 2 is a timing chart showing a current waveform so as to explain a behavior of the power converter 10a shown in FIG. 1.

As shown in FIG. 2, a power converter as an in-vehicle power converter 10a to be mounted on motor vehicles is usually used under a voltage boost ratio of not less than 50%. This increases a load of the lower arm side switching elements in the power converter. This structure further increases a conductive-time length of upper arm side switching elements in a non-voltage boost mode and a low voltage boost ratio.

In order to achieve this, the power converter 10a according to the first exemplary embodiment is equipped with an RC-IGBT (Reverse Conducting IGBT) having a freewheel diode with each of the first lower arm side switching element 13a and the second lower arm side switching element 13b. The RC-IGBT supplies a large current and has a low power loss. The RC-IGBT is composed of an IGBT and a freewheel diode which is connected in reversely parallel with the IGBT. Accordingly, the power converter 10a according to the first exemplary embodiment provides a large current and has a low power loss. It is acceptable to use IGBTs as the first lower arm side switching element 13a and the second lower arm side switching element 13b instead of using the RC-IGBTs. The use of these IGBTs provides a large current and a low power loss.

A description will be given of the voltage reduction mode of the power converter 10a.

The control unit 50 turns off both the first lower arm side switching element S21 and the second lower arm side switching element S22, and simultaneously turns on the first upper arm side switching part S11 and the second upper arm side switching part S12. This control step allows a current to flow from the motor generator 40 to the reactor 11. The reactor 11 accumulates the received electric power energy. After this, the control unit 50 turns off both the first lower arm side switching element S21 and the second lower arm side switching element S22 under the turned-off state of the first lower arm side switching element S21 and the second lower arm side switching element S22. These control steps allow the reactor 11 to supply the accumulated electric power energy, and allows a current to flow from the reactor 11 to the battery 20. The battery 20 accumulates the received electric power.

Next, a description will now be given of the non-voltage boost mode (as a through mode). The non-voltage boost mode provides the DC voltage of the battery 20 to the motor generator 40 without boosting the DC voltage of the battery 20.

Figure 3:
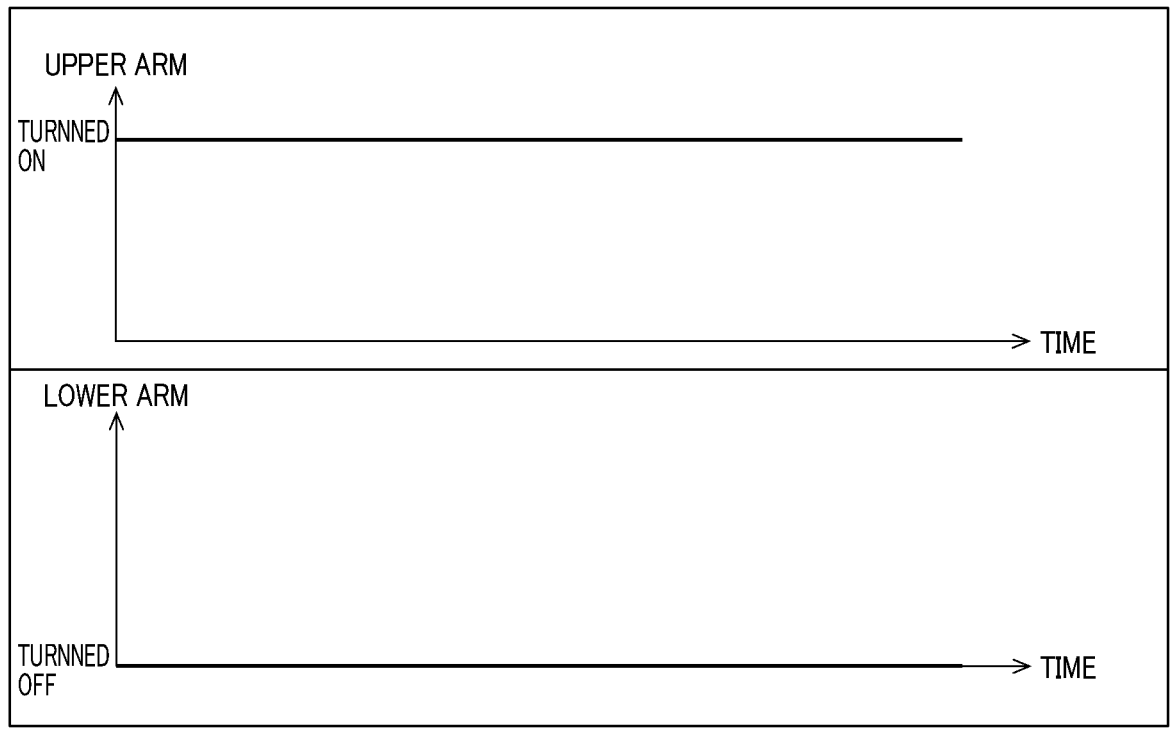
FIG. 3 is a timing chart showing a behavior of each of an upper arm side switching element and a corresponding lower arm side switching element in the power converter shown in FIG. 1.

FIG. 3 is a timing chart showing the behavior of each of the upper arm side switching element and the corresponding lower arm side switching element in the power converter 10a shown in FIG. 1.

As shown in FIG. 3, the control unit 50 turns off both the first lower arm side switching element S21 and the second lower arm side switching element S22, and simultaneously turns on both the first upper arm side switching part S11 and the second upper arm side switching part S12. In this control state, the battery 20 supplies a current which flows from the battery 20 to the motor generator 40 through the first lower arm side switching element S21, the second lower arm side switching element S22, the first upper side diode D11 and the second upper side diode D12. Because the control unit 50 turns off both the first lower arm side switching element S21 and the second lower arm side switching element S22, the DC voltage of the battery 20 is not boosted.

In general, the control unit 50 usually performs the non-voltage boost mode during an efficient fuel consumption region. Because the power converter 10a uses a MOS FET as the first upper arm side switching element 12a, it is possible for the power converter 10a to reduce a conductive loss. That is, the power converter 10a according to the first exemplary embodiment improves the fuel economy rate of a motor vehicle. The efficient fuel consumption region represents the region between the non-voltage boost state and a state of a low voltage boost ratio.

The concept of the present invention is not limited by the first exemplary embodiment. It is possible for the present disclosure to provide various modifications, for example, the second exemplary embodiment to a ninth exemplary embodiment of the present disclosure. Further, it is possible to combine two or more of the first to ninth exemplary embodiments.

Second Exemplary Embodiment

A description will be given of the electric power conversion device for motor vehicles according to the second exemplary embodiment with reference to FIG. 4 and FIG. 5.

Figure 4:
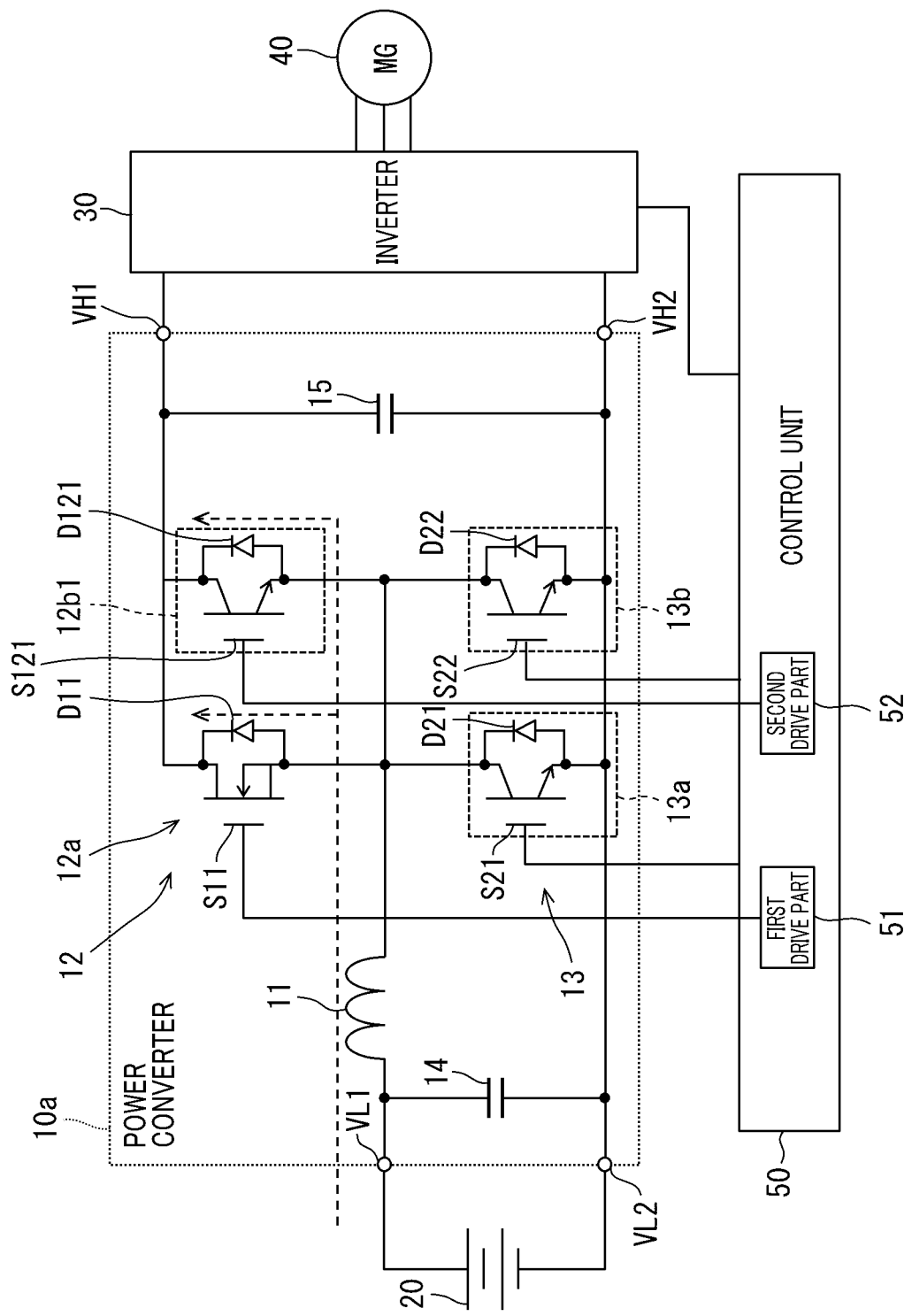
FIG. 4 is a view showing a schematic circuit structure of the power converter in the power conversion device according to a second exemplary embodiment of the present disclosure.

FIG. 4 is a view showing a schematic circuit structure of the power converter 10a in the power conversion device according to the second exemplary embodiment of the present disclosure. FIG. 5 is a view showing Vf characteristics of an RC-IGBT used in the power converter 10a shown in FIG. 4.

Figure 5:
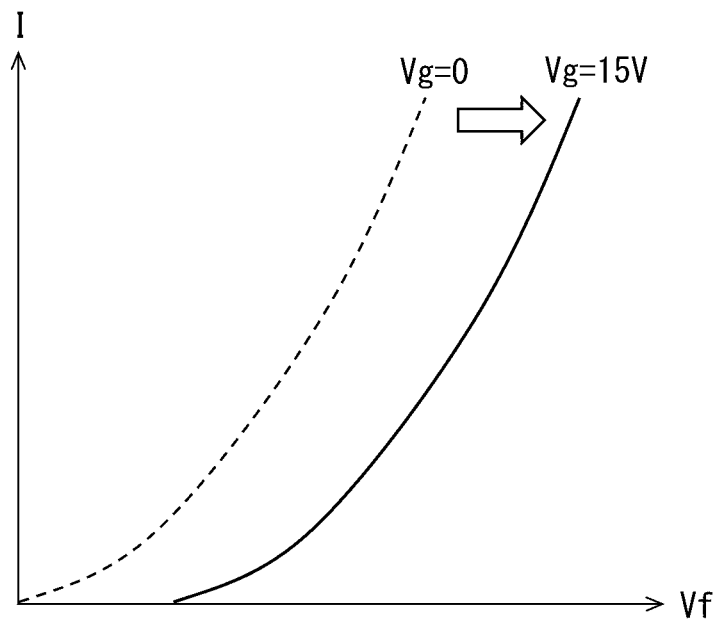
FIG. 5 is a view showing Vf characteristics of an RC-IGBT in the power converter shown in FIG. 4.

As shown in FIG. 4 and FIG. 5, the control unit 50, the first upper arm side switching element 12a and the second upper arm side switching element 12b in the power conversion device according to the second exemplary embodiment shown in FIG. 4 are different in behavior and structure from the first upper arm side switching element 12a and the second upper arm side switching element 12b in the power conversion device according to the first exemplary embodiment shown in FIG. 1.

Further, the power converter 10a shown in FIG. 4 uses an RC-IGBT as a second upper arm side switching element 12b1. This structure of the power converter 10a shown in FIG. 4 is different from the power converter 10a shown in FIG. 1.

The second upper arm side switching element 12b1 composed of the RC-IGBT has a second upper arm side switching part S121 and a second upper arm side diode D121 as a freewheel diode.

The control unit 50 has a first drive part 51 and a second drive part 52. The first drive part 51 drives the first upper arm side switching part S11. On the other hand, the second drive part 52 drives the second upper arm side switching part S121. That is, the first drive part 51 drives a MOS FET as the first upper arm side switching element 12a, and the second drive part 52 drives the RC-IGBT as the second upper arm side switching element 12b1.

That is, the control unit 50 in the power conversion device according to the second exemplary embodiment shown in FIG. 4 drives independently each of the first upper arm side switching element 12a and the second upper arm side switching element 12b1.

For example, it is possible for the control unit 50 to instruct the first drive part 51 to drive the first upper arm side switching element 12a only, and to instruct the second drive part 52 to not drive the second upper arm side switching element 12*b*1. Still further, it is also possible for the control unit 50 to instruct the first drive part 51 to not drive the first upper arm side switching element 12*a*, and to instruct the second drive part 52 to drive the second upper arm side switching element 12*b*1 only.

As shown in FIG. 5, an RC-ICBT has Vf characteristics which are deteriorated when a gate voltage Vg is supplied to the RC-IGBT as compared with that when Vg=0. Accordingly, it is possible for the power converter 10*a* to reduce a drive loss, i.e. to suppress the deterioration of the Vf characteristics of the RC-IGBT by the following manner.

When a current is supplied to the upper arm 12, the first drive part 51 supplies a gate voltage to the first upper arm side switching element 12*a* so as to turn on the first upper arm side switching element 12*a*, and the second drive part 52 prohibits the gate voltage from being supplied to the second upper arm side switching element 12*b*1.

For example, when the control unit 50 turns off both the first lower arm side switching element S21 and the second lower arm side switching part S22, and turns on both the first upper arm side switching part S11 and the second upper arm side switching part S121 during the non-voltage boost mode, the control unit 50 continuously turns on the first upper arm side switching part S11 only, and turns off the second upper arm side switching part S121. This control of the power converter 10*a* makes it possible to reduce the drive loss. The power conversion device according to the second exemplary embodiment shown in FIG. 4 has the same effects as the power conversion device according to the second exemplary embodiment shown in FIG. 1.

It is acceptable for the upper arm 12 to have a MOS FET as the second upper arm side switching element 12*b* in addition to the first upper arm side switching element 12*a*. In this structure, the first control part 51 drives both the first upper arm side switching element 12*a* composed of a MOS FET and the second upper arm side switching element 12*b* composed of a MOS FET.

Further, it is acceptable for the upper arm 12 to have a MOS FET as the second upper arm side switching element 12*b* in addition to the first upper arm side switching element 12*a* composed of a non-MOS FET. In the latter case, the second control part 52 drives both the second upper arm side switching element 12*b* and the element composed of the non-MOS FET in the upper arm 12.

Third Exemplary Embodiment

A description will be given of the electric power conversion device for motor vehicles according to the third exemplary embodiment with reference to FIG. 6.

Figure 6:
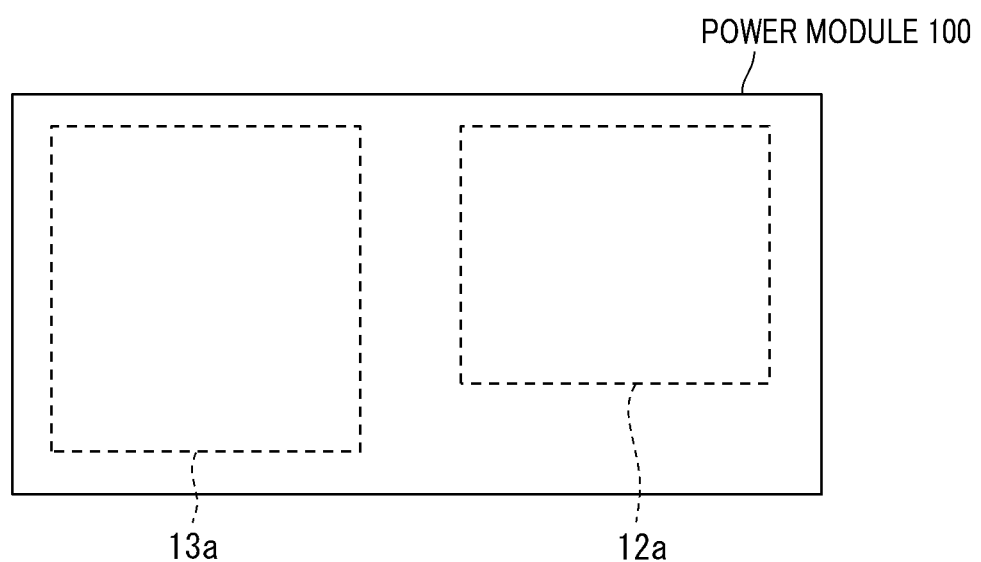
FIG. 6 is a plan view explaining a schematic structure of a power module in the power converter according to a third exemplary embodiment of the present disclosure.

FIG. 6 is a plan view explaining a schematic structure of a power module 100 in the power converter according to the third exemplary embodiment of the present disclosure. As shown in FIG. 6, the power module 100 is composed of the first upper arm side switching element 12*a* and the first lower arm side switching element 13*a* which are packaged in a casing. This structure according to the third exemplary embodiment is different from the structure of the first exemplary embodiment shown in FIG. 1.

In the structure of the power conversion device according to the third exemplary embodiment, the first upper arm side switching element 12*a* is composed of a MOS FET.

The first upper arm side switching element 12*a* has the first upper arm side switching part S11 and the first upper arm side diode D11 as a parasitic diode.

On the other hand, the first lower arm side switching element 13*a* has an RC-IGBT. The first lower arm side switching element 13*a* has the first lower arm side switching element S21 and the first upper arm side diode D21. Accordingly, the power module 100 shown in FIG. 6 has both a MOS FET and an RC-IGBT packaged in the single casing. The power module 100 has no upper arm side diode to be arranged independently from the first upper arm side switching part S11 and has no lower arm side diode to be arranged independently from the first lower arm side switching element S21.

The power module 100 has a pair of conductive members, a plurality of terminals and an insulation member in addition to the first upper arm side switching element 12*a* and the first lower arm side switching element 13*a*. The insulation member is made of resin. The first upper arm side switching element 12*a*, the first lower arm side switching element 13*a*, a part of each of the conductive members, and a part of each of the terminals are covered with the insulation member made of resin. The insulation member electrically protects the first upper arm side switching element 12*a* and the first lower arm side switching element 13*a*, etc. from other members.

Each of the pair of conductive members is arranged between the first upper arm side switching element 12*a* and the first lower arm side switching element 13*a*. Each of the conductive members is connected to the respective terminal. Further, each of the conductive members functions as a heat dissipating member. The terminals are electrically connected to the electrode of the first upper arm side switching element 12*a* and the electrode of the first lower arm side switching element 13*a*. A part of each of the terminals is exposed from the insulation member.

The power module 100 has the structure in which a part of each of the conductive members and a part of each of the terminals, which are exposed from the insulation member, are electrically connected to external devices arranged outside of the power module 100. For example, the power module 100 is electrically connected to the control unit 50 through the exposed part of each of the terminals, exposed from the insulation member, and electrically connected to the inverter 30 through the exposed part of each of the conductive members and the exposed part of each of the terminals, exposed from the insulation member.

The power conversion device for motor vehicles having the power module 100 shown in FIG. 6 has the same effects as the power conversion device according to the first exemplary embodiment shown in FIG. 1. It is possible to reduce and miniaturize the size of the package of the power module 100 when the first upper arm side switching element 12*a* composed of a MOS FET and the first lower arm side switching element 13*a* composed of an RC-IGBT are arranged together in the casing of the power module 100. Because the size of an RC-IGBT is smaller than a combination of an IGBT and a diode, it is possible to reduce the size of the power module 100 when compared with a power module in which an upper arm side MOS FET and a diode, and a lower arm side IGBT and a diode are assembled together.

The third exemplary embodiment reduces the manufacturing cost of the power conversion device because of having the power module 100 previously described.

It is acceptable to use an additional power module in which the second upper arm side switching element 12*b* and the second lower arm side switching element 13*b* are packaged together, similar to the combination of the first upper arm side switching element 12*a* and the first lower arm side switching element 13*a*.

When the power conversion device has not less than three upper arm side switching elements and not less than three lower arm side switching elements, it is also acceptable to have a structure in which each of the upper arm side switching elements and each of the lower arm side switching elements are packaged together, similar to a combination of the first upper arm side switching element 12a and the first lower arm side switching element 13a.

Fourth Exemplary Embodiment

A description will be given of the electric power conversion device for motor vehicles according to the fourth exemplary embodiment with reference to FIG. 7.

Figure 7:
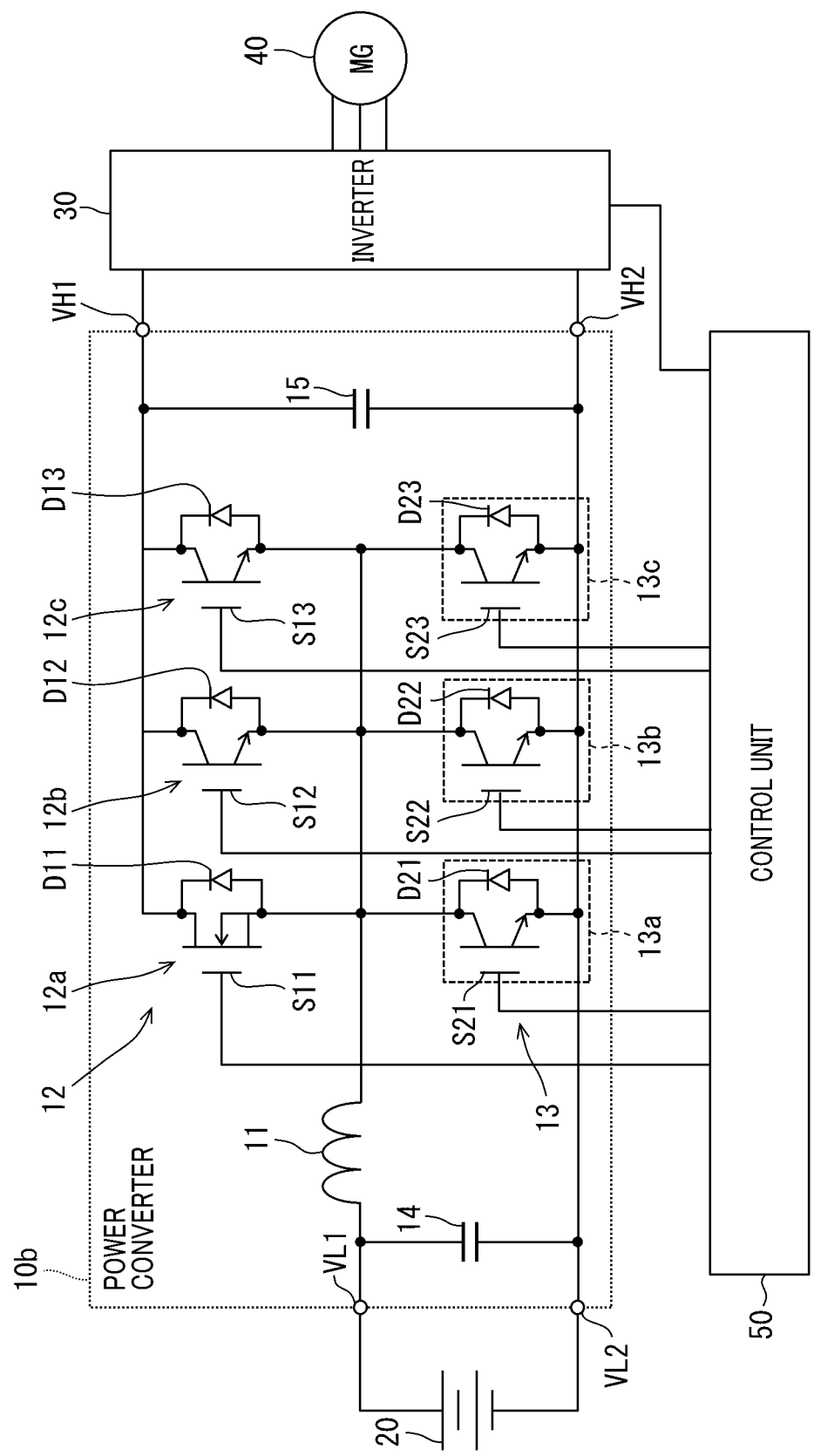
FIG. 7 a view showing a schematic structure of the power converter in the power conversion device according to a fourth exemplary embodiment of the present disclosure.

FIG. 7 a view showing a schematic structure of the power converter 10-b in the power conversion device according to the fourth exemplary embodiment of the present disclosure.

In the power converter 10-b in the power conversion device according to the fourth exemplary embodiment shown in FIG. 7, the structure of the upper arm 12 and the lower arm 13 is different from these in the power conversion device according to the first exemplary embodiment shown in FIG. 1.

As shown in FIG. 7, the power converter 10b has a third upper arm side switching element 12c in addition to the first upper arm side switching element 12a and the second upper arm side switching element 12b. The third upper arm side switching element 12c has the same structure as the second upper arm side switching element 12b. That is, the third upper arm side switching element 12c has a third upper arm side switching part S13 and a third upper arm side diode D13 as a freewheel diode.

A drain of the third upper arm side switching part S13 is connected to the high voltage line, and a source of the third upper arm side switching part S13 is connected to a collector of a third lower arm side switching part S23, and a gate of the third upper arm side switching part S13 is connected to the control unit 50. Similar to the second upper arm side switching element 12b, the third upper arm side switching element 12c is composed of a MOS FET or an RC-IGBT.

As shown in FIG. 7, the power converter 10b has a third lower arm side switching element 13c in addition to the first lower arm side switching element 13a and the second lower arm side switching element 13b. The third lower arm side switching element 13c has the same structure as the second lower arm side switching element 13b. That is, the third lower arm side switching element 13c has a third lower arm side switching part S23 and a third lower arm side diode D23 as a freewheel diode.

A collector of the third lower arm side switching part S23 is connected to a source of the third upper arm side switching part S13, and an emitter of the third lower arm side switching part S23 is connected to the low voltage line. A gate of the third lower arm side switching part S23 is connected to the control unit 50. The power conversion device according to the fourth exemplary embodiment has the same effects as the power conversion device according to the first exemplary embodiment.

Fifth Exemplary Embodiment

A description will be given of the electric power conversion device for motor vehicles according to the fifth exemplary embodiment with reference to FIG. 8 and FIG. 9.

Figure 8:
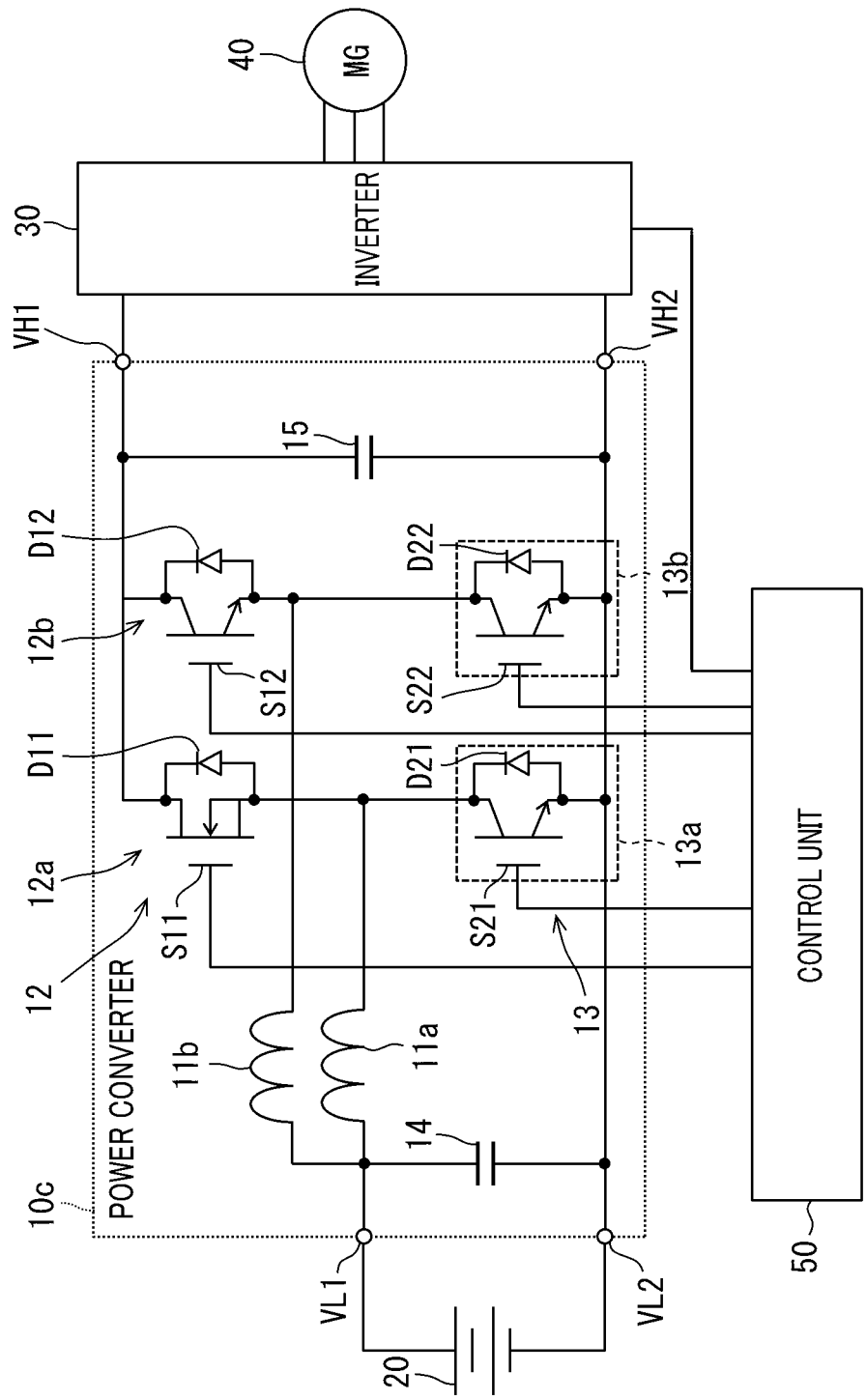
FIG. 8 a view showing a schematic structure of the power converter in the power conversion device according to a fifth exemplary embodiment of the present disclosure.

FIG. 8 a view showing a schematic structure of the power converter 10c in the power conversion device according to a fifth exemplary embodiment of the present disclosure.

Figure 9:
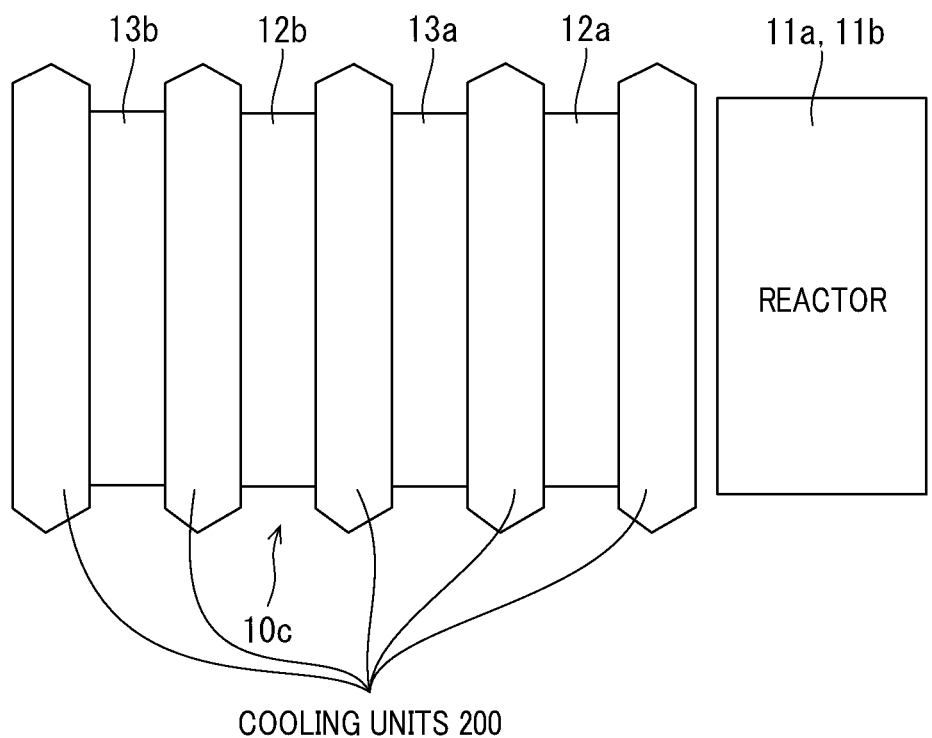
FIG. 9 a view showing a schematic structure of the power converter in the power conversion device according to the fifth exemplary embodiment of the present disclosure.

FIG. 9 a view showing a schematic structure of the power converter 10c in the power conversion device according to the fifth exemplary embodiment of the present disclosure.

As shown in FIG. 8, the power converter 10c according to the fifth exemplary embodiment has the first upper arm side switching element 12a, the second upper arm side switching element 12b, the first lower arm side switching element 13a, the second lower arm side switching element 13b, a first reactor 11a and a second reactor 11b. The power converter 10c according to the fifth exemplary embodiment shown in FIG. 8 and FIG. 9 is different in structure from the power converter 10a according to the first exemplary embodiment shown in FIG. 1.

The power converter 10c has a first phase which is composed of the first reactor 11a, the first upper arm side switching element 12a and the first lower arm side switching element 13a. The first upper arm side switching element 12a and the first lower arm side switching element 13a shown in FIG. 8 and FIG. 9 have the same structure as the first upper arm side switching element 12a and the first lower arm side switching element 13a shown in FIG. 1.

One terminal of the first reactor 11a is electrically connected to the battery 20, and the other terminal of the first reactor 11a is electrically connected to a connection node between the first upper arm side switching part S11 in the first upper arm side switching element 12a and the first lower arm side switching element S21 in the first lower arm side switching element 13a. In more detail, the first reactor 11a is electrically connected through a bus bar (as a conduction member, not shown) to the first upper arm side switching element 12a and the first lower arm side switching element 13a.

The power converter 10c has a second phase which is composed of the second reactor 11b, the second upper arm side switching element 12b and the second lower arm side switching element 13b. The second upper arm side switching element 12b and the second lower arm side switching element 13b shown in FIG. 8 and FIG. 9 have the same structure as the second upper arm side switching element 12b and the second lower arm side switching element 13b shown in FIG. 1.

One terminal of the second reactor 11b is electrically connected to the battery 20, and the other terminal of the second reactor 11b is electrically connected to a connection node between the second upper arm side switching part S12 in the second upper arm side switching element 12b and the second lower arm side switching element S22 in the second lower arm side switching element 13b. In more detail, the second reactor 11b is electrically connected through a bus bar (as a conduction member, not shown) to the second upper arm side switching element 12b and the second lower arm side switching element 13b.

The first reactor 11a and the second reactor 11b are arranged together in the same casing, for example. FIG. 9 shows a schematic structure in which the first reactor 11a and the second reactor 11b are assembled together and accommodated on the same casing.

As shown in FIG. 9, in the power converter 10c according to the fifth exemplary embodiment, each of the first upper arm side switching element 12a, the second upper arm side switching element 12b, the first lower arm side switching element 13a and the second lower arm side switching element 13b are alternately arranged between the cooling units 200. Because those switching elements 12a, 12b, 13a and 13b generate thermal energy when activated, the cooling units 200 cool these switching elements 12a, 12b, 13a and 13b.

As shown in FIG. 9, in the structure of the power converter 10c according to the fifth exemplary embodiment, the first upper arm side switching element 12a composed of a MOS FET is arranged closer to the first reactor 11a and the second reactor 11b when compared with the location of the second upper arm side switching element 12b, the first lower arm side switching element 13a and the second lower arm side switching element 13b. This arrangement makes it possible to reduce a total length of the bus bar through which the first upper arm side switching element 12a is connected to the first reactor 11a. That is, in the structure of the power converter 10c, it is possible to reduce the total length of the bus bar, more than a length of a bus bar when the first upper arm side switching element 12a is arranged far from the first reactor 11a and the second reactor 11b when compared with the switching elements 12b, 13a and 13b.

Further, this structure of the power converter 10c makes it possible to reduce a conductive loss when compared with the arrangement in which the first upper arm side switching element 12a is arranged far from the first reactor 11a and the second reactor 11b when compared with the other switching elements 12b, 13a and 13b. That is, the arrangement of the switching elements 12a, 12b, 13a and 13b in the power converter 10c according to the fifth exemplary embodiment reduces an electrical resistance of the bus bar, and reduces a conductive loss. Still further, the power converter 10c according to the fifth exemplary embodiment shown in FIG. 8 has the same effects as the power converter 10c according to the first exemplary embodiment shown in FIG. 1.

Still further, it is possible to apply, to the structure of each of the first to fourth exemplary embodiments, and to the structure of each of the seventh to ninth exemplary embodiments, the arrangement of the first upper arm side switching element 12a, the second upper arm side switching element 12b, the first lower arm side switching element 13a and the second lower arm side switching element 13b shown in FIG. 8.

Sixth Exemplary Embodiment

A description will be given of the electric power conversion device for motor vehicles according to the sixth exemplary embodiment with reference to FIG. 10.

Figure 10:
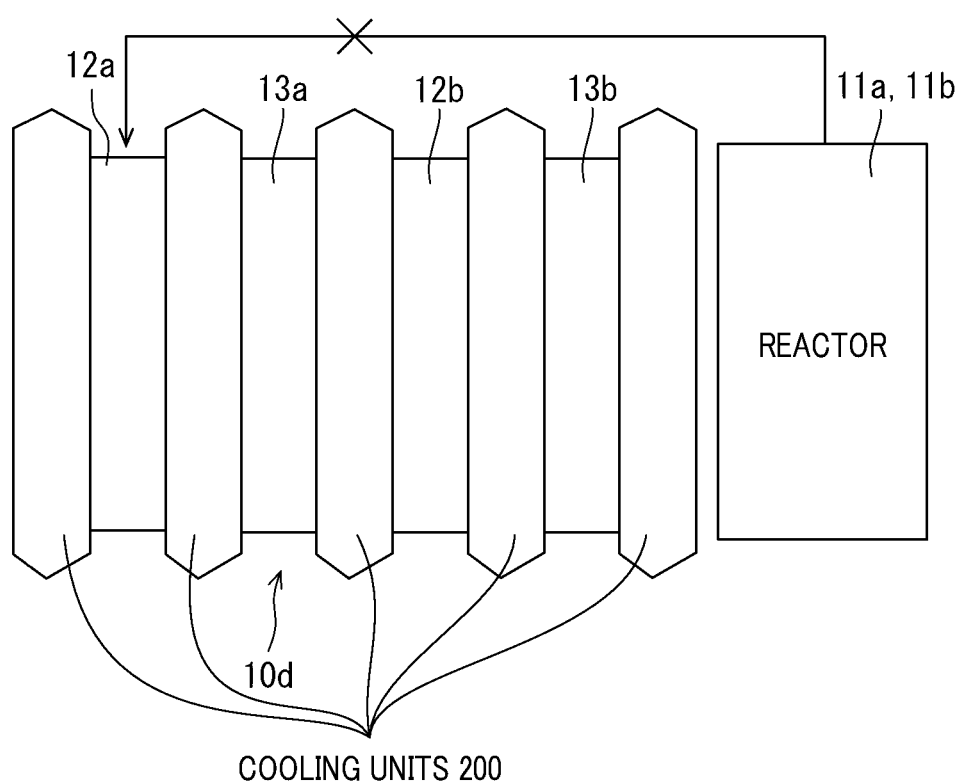
FIG. 10 a view showing a schematic structure of the power converter in the power conversion device according to a sixth exemplary embodiment of the present disclosure.

FIG. 10 a view showing a schematic structure of the power converter in the power conversion device 10d according to the sixth exemplary embodiment of the present disclosure. As shown in FIG. 10, the power converter 10d according to the sixth exemplary embodiment has the first upper arm side switching element 12a, the second upper arm side switching element 12b, the first lower arm side switching element 13a, the second lower arm side switching element 13b, the first reactor 11a and the second reactor 11b. The power converter 10d according to the sixth exemplary embodiment is different in structure from the power converter 10c according to the fifth exemplary embodiment shown in FIG. 8.

In the structure of the power converter 10d according to the sixth exemplary embodiment shown in FIG. 10, the first upper arm side switching element 12a composed of a MOS FET is arranged further from the first reactor 11a and the second reactor 11b than the location is of the second upper arm side switching element 12b, the first lower arm side switching element 13a and the second lower arm side switching element 13b. This arrangement makes it possible to allow the first upper arm side switching element 12a to be influenced due to thermal energy generated in the first reactor 11a and the second reactor 11b.

That is, it is possible for the structure of the power converter 10d shown in FIG. 10 to reduce the thermal influence when compared with a case in which the first upper arm side switching element 12a is arranged close to the first reactor 11a and the second reactor 11b when compared with the location of the switching elements 12b, 13a and 13b. The structure of the power converter 10d suppress thermal influence because the first upper arm side switching element 12a is arranged far from the first reactor 11a and the second reactor 11b. In addition, the power converter 10d according to the sixth exemplary embodiment shown in FIG. 10 has the same effects as the power converter 10a according to the first exemplary embodiment.

Still further, it is possible to apply, to the structure of each of the first to fourth exemplary embodiments, and to the structure of each of the seventh to ninth exemplary embodiments, the arrangement of the first upper arm side switching element 12a, the second upper arm side switching element 12b, the first lower arm side switching element 13a and the second lower arm side switching element 13b shown in FIG. 10.

Seventh Exemplary Embodiment

A description will be given of the electric power conversion device for motor vehicles according to the seventh exemplary embodiment with reference to FIG. 11.

Figure 11:
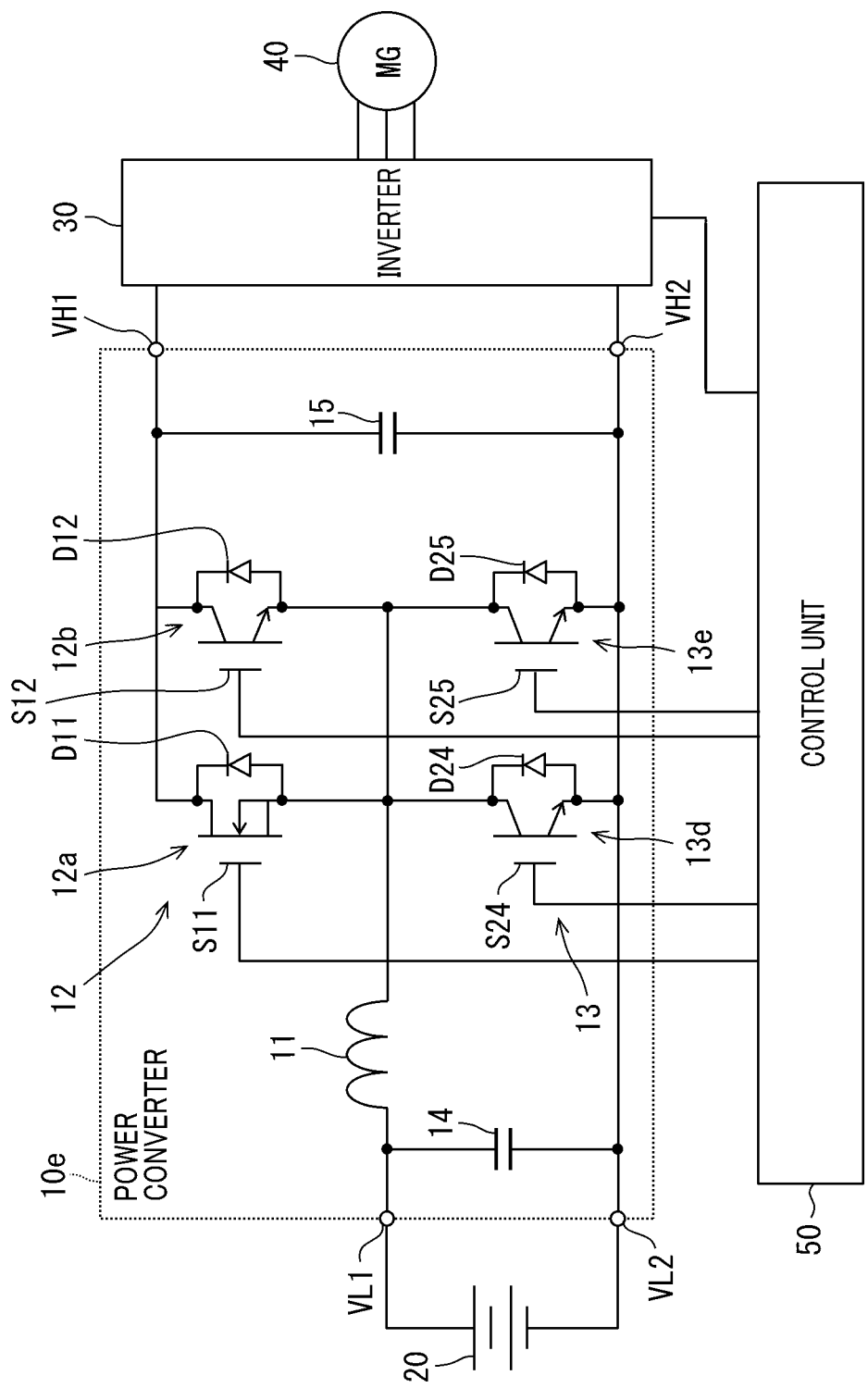
FIG. 11 a view showing a schematic structure of the power converter in the power conversion device according to a seventh exemplary embodiment of the present disclosure.

FIG. 11 a view showing a schematic structure of the power converter 10e in the power conversion device according to the seventh exemplary embodiment of the present disclosure. The structure of a first lower arm side switching element 13d and a second lower arm side switching element 13e shown in FIG. 11 are different in structure from the first lower arm side switching element 13a and the second lower arm side switching element 13b shown in FIG. 1.

As shown in FIG. 11, the power converter 10e according to the seventh exemplary embodiment has the lower arm 13 composed of the first lower arm side switching element 13d and the second lower arm side switching element 13e as the lower arm side switching elements.

The first lower arm side switching element 13d has a first lower arm side switching part S24 and a first lower arm side diode D24 as a freewheel diode. Similarly, the second lower arm side switching element 13e has a second lower arm side switching part S25 and a second lower arm side diode D25 as a freewheel diode. The first lower arm side switching element 13d and the second lower arm side switching element 13e have the same structure.

Each of the first lower arm side switching element 13d and the second lower arm side switching element 13e is composed of an insulated gate bipolar transistor (IGBT). The collector of the first lower arm side switching part S24 is connected to a source of the first upper arm side switching part S11. The emitter of the first lower arm side switching part S24 is connected to the low voltage line. The gate of the first lower arm side switching part S24 is connected to the control unit 25. On the other hand, the collector of the second lower arm side switching part S25 is connected to the emitter of the second upper arm side switching part S12. The emitter of the second lower arm side switching part S25 is connected to the low voltage line. The gate of the second lower arm side switching part S25 is connected to the control unit 50.

As previously described, although each of the first lower arm side switching element 13d and the second lower arm side switching element 13e shown in FIG. 11 is composed of an IGBT, instead of using an RC-IGBT, the power converter 10e according to the seventh exemplary embodiment has the same effects as the power converter 10a according to the first exemplary embodiment shown in FIG. 1

Eighth Exemplary Embodiment

A description will be given of the electric power conversion device for motor vehicles according to the eighth exemplary embodiment with reference to FIG. 12.

Figure 12:
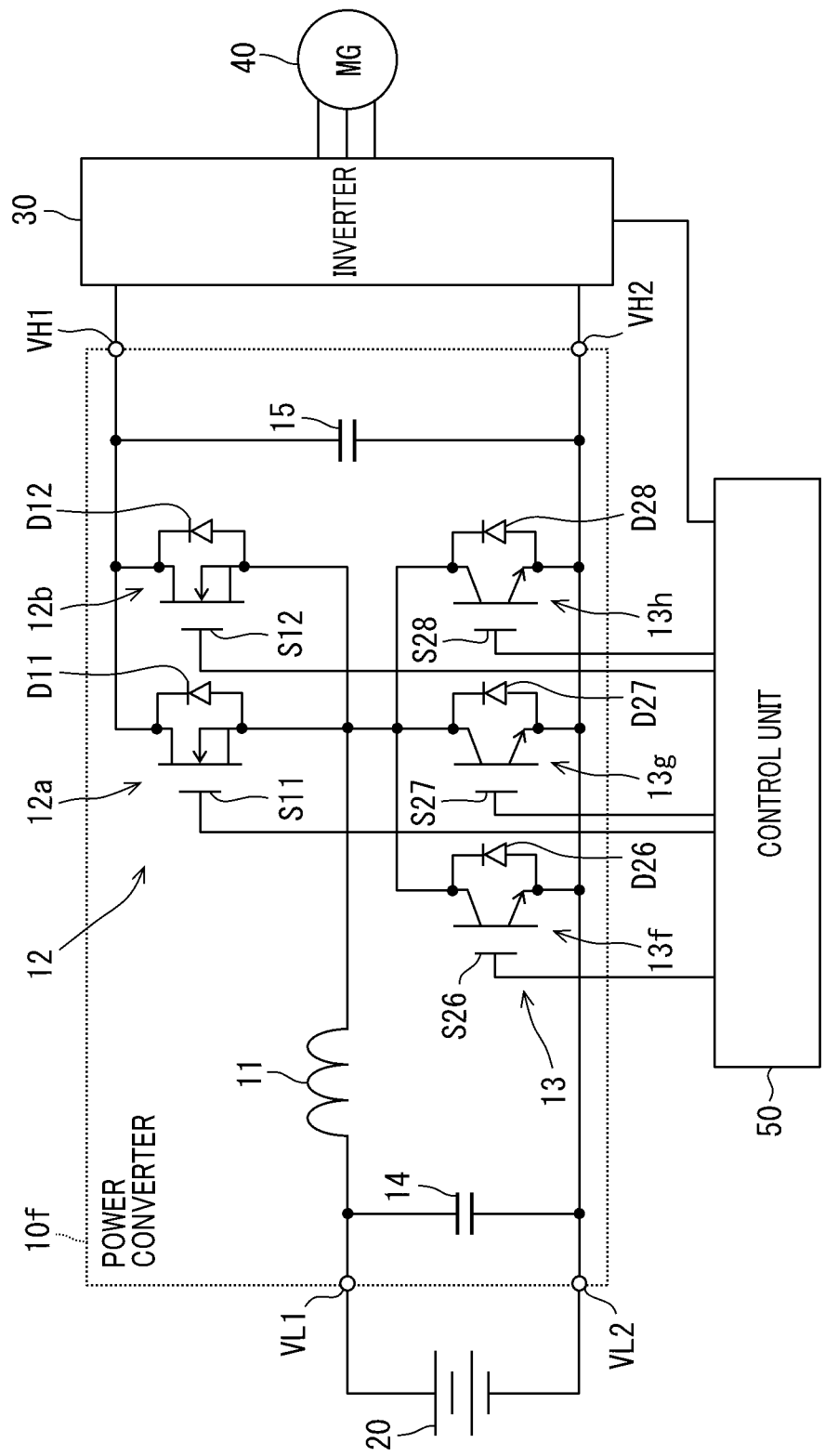
FIG. 12 a view showing a schematic structure of the power converter in the power conversion device according to an eighth exemplary embodiment of the present disclosure.

FIG. 12 a view showing a schematic structure of the power converter f in the power conversion device according to the eighth exemplary embodiment. The power converter 10f according to the eighth exemplary embodiment shown in FIG. 12 has a structure which is different from the structure of the power converter 10e according to the seventh exemplary embodiment shown in FIG. 11. That is, in the power converter 10f, the total number of the first upper arm side switching element 12a and the second upper arm side switching element 12b forming the upper arm 12 is different from the total number of a first lower arm side switching element 13f, a second lower arm side switching element 13g, and a third lower arm side switching element 12h.

Similar to the power converter 10e according to the seventh exemplary embodiment shown in FIG. 11, the power converter 10f according to the eighth exemplary embodiment shown in FIG. 12 has the upper arm 12 composed of the first upper arm side switching element 12a and the second upper arm side switching element 12b. The power converter 10f has the lower arm 13 composed of the first lower arm side switching element 13f, the second lower arm side switching element 13g, and the third lower arm side switching element 12h.

The first lower arm side switching element 13f has a first lower arm side switching part S26 and a first lower arm side diode D26 as a freewheel diode. The second lower arm side switching element 13g has a second lower arm side switching part S27 and a second lower arm side diode D27 as a freewheel diode. The third lower arm side switching element 13h has a third lower arm side switching part S28 and a third lower arm side diode D28 as a freewheel diode. Each of the first lower arm side switching element 13f, the second lower arm side switching element 13g and the third lower arm side switching element 13h has the same structure as the first lower arm side switching element 13d in the power converter 10e according to the seventh exemplary embodiment shown in FIG. 11.

As previously described, in the structure of the power converter 10f according to the eighth exemplary embodiment, the total number of the switching elements 12a and 12b in the upper arm 12 is smaller than the total number of the switching elements 13f, 13g and 13g in the lower arm 13. FIG. 12 shows one example of the structure of the power converter 10f according to the eighth exemplary embodiment.

The power converter 10f according to the eighth exemplary embodiment has the same effects as the power converter 10e according to the seventh exemplary embodiment. In addition, the power converter 10f according to the eighth exemplary embodiment can supply a large current and reduce a conductive low because of increasing the total number of the switching elements in the lower arm 13 side having a high current load when compared with those of the upper arm 12 side.

It is possible to use an RC-IGBT (Reverse Conducting IGBT) to form each of the lower arm side switching elements 13f, 13g and 13h.

Further, it is sufficient to form the upper arm 12 so that the total number of the switching elements therein is smaller than that of the switching elements in the lower arm 13. Accordingly, it is acceptable for the upper arm 12 to have not less than three switching elements, and for the lower arm 13 to have not less than four switching elements.

Ninth Exemplary Embodiment

A description will be given of the electric power conversion device for motor vehicles according to the ninth exemplary embodiment with reference to FIG. 13.

Figure 13:
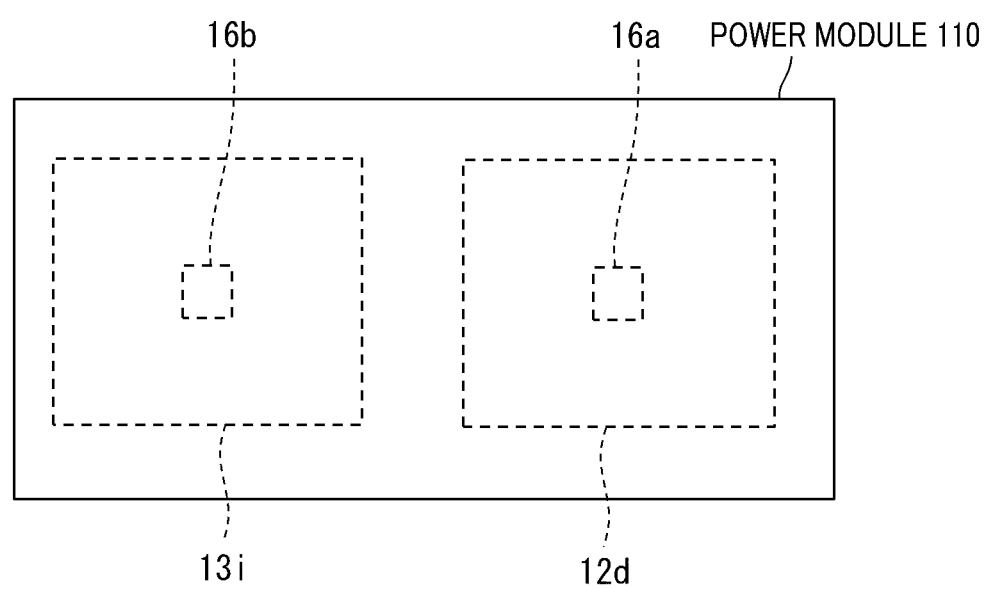
FIG. 13 is a plan perspective view explaining a schematic structure of a power module in the power converter according to a ninth exemplary embodiment of the present disclosure.

FIG. 13 is a plan perspective view explaining a schematic structure of a power module 110 in the power converter according to the ninth exemplary embodiment. The power module 110 shown in FIG. 13 has a structure composed of a first upper arm side switching element 12d, a first lower arm side switching element 13i, an upper side temperature sensitive diode 16a and a lower side temperature sensitive diode 16b.

On the other hand, as previously described, the power module 100 in the power converter in the power conversion device according to the third exemplary embodiment shown in FIG. 6 has the first upper arm side switching element 12a and the first lower arm side switching element 13a only, and do not have any temperature sensitive diode.

It is also acceptable for the power module 110 to have the upper side temperature sensitive diode 16a only, not to have the lower side temperature sensitive diode 16b.

For example, it can be considered for a power module as a comparative example to have an upper arm side switching element (which is composed of a MOS FET), an upper arm side diode, a lower arm side switching element and a lower arm side diode which are packaged together. In this structure of the power module as a comparative example, it is required to use temperature sensors (for example, temperature sensitive diodes, etc.) so as to detect a temperature of each of a MOS FET and a switching element in the upper arm side. It is also required to use a temperature sensor so as to detect a temperature of one of a MOS FET and a switching element in the upper arm side, and to estimate a temperature of the other on the basis of the detected temperature. It is also necessary to arrange thermistors at a location close to a MOS FET and a switching element in the upper arm side so as to detect a temperature of each of a MOS FET and the switching element.

However, a manufacturing cost of a power conversion device increases due to the use of such temperature sensors. Further, the use of such temperature sensors often causes a temperature estimation error. When a temperature detection error occurs, it is necessary to increase a size of each switching element in the power module. This increases a manufacturing cost of the power conversion device, and it is necessary to reduce an output of a temperature sensor so as to avoid a temperature detection error.

In order to avoid these problems, the power module 110 shown in FIG. 13 has the upper arm side switching element 12d and the lower arm side switching element 13i which are packaged together. Further, the upper arm side switching element 12d is composed of a MOS FET. The upper arm side switching element 12d has a first upper arm side switching part and a first upper arm side diode part. On the other hand, the lower arm side switching element 13i is composed of an RC-IGBT. As previously described, in the structure of the power module 110 in the power converter according to the ninth exemplary embodiment shown in FIG. 13, the upper arm side switching element 12d does not have any separate-type additional diode and the lower arm side switching element 13*i* does not have any separate-type additional diode.

The second upper arm side switching element and the second lower arm side switching element, and other upper arm side and lower arm side switching elements are packaged together, and have the same structure of the first upper arm side switching element 12*d* and the first lower arm side switching element 13*i*. Accordingly, the following explanation can be applied to the second upper arm side switching element and the second lower arm side switching element, and other upper arm side and lower arm side switching elements.

In the structure of the power module 110, the first upper arm side switching element 12*d* has the upper arm side temperature sensitive diode 16*a* so as to detect a temperature of the first upper arm side switching element 12*d*. That is, the upper side temperature sensitive diode 16*a* detects a temperature of the first upper arm side switching element as the first upper arm side switching element 12*d* and the first upper arm side diode. In other words, the upper side temperature sensitive diode 16*a* detects a temperature of the first upper arm side switching element 12*d* increased by thermal energy generated by the first upper arm side switching element 12*d* itself.

Because the upper side temperature sensitive diode 16*a* is electrically connected to the control unit 50, it is possible for the control unit 50 to receive a detection signal regarding a detected temperature transmitted from the upper side temperature sensitive diode 16*a*. The control unit 50 determines a detected temperature of the first upper arm side switching element 12*d* on the basis of the received detection signal.

When the detected temperature of the first upper arm side switching element 12*d* reaches a predetermined threshold temperature, the control unit 50 stops the first upper arm side switching element 12*d* operating. The predetermined threshold temperature has been determined on the basis of a temperature when the first upper arm side switching element 12*d* enters an abnormality state. The structure of the power module 110 in the power converter shown in FIG. 13 makes it possible to suppress the first upper arm side switching element 12*d* from entering the abnormality state caused by thermal energy, and to protect the first upper arm side switching element 12*d* from thermal energy.

In the structure of the power module 110, the first lower arm side switching element 13*i* has the lower arm side temperature sensitive diode 16*b* so as to detect a temperature of the first lower arm side switching element 13*i*. That is, the lower arm side temperature sensitive diode 16*b* detects a temperature of the RC-IGBT as the first lower arm side switching element 13*i*. In other words, the lower arm side temperature sensitive diode 16*b* detects a temperature of the first lower arm side switching element 13*i* increased by thermal energy generated by the first lower arm side switching element 13*i* itself.

Because the lower arm side temperature sensitive diode 16*b* is electrically connected to the control unit 50, it is possible for the control unit 50 to receive a detection signal regarding a detected temperature transmitted from the lower arm side temperature sensitive diode 16*b*. The control unit 50 determines a detected temperature of the first lower arm side switching element 13*i* on the basis of the received detection signal.

When the detected temperature of the first lower arm side switching element 13*i* reaches a predetermined threshold temperature, the control unit 50 stops the first lower arm side switching element 13*i* operating. The predetermined threshold temperature has been determined on the basis of a temperature when the first lower arm side switching element 13*i* enters an abnormality state. The structure of the power module 110 in the power converter shown in FIG. 13 makes it possible to suppress the first lower arm side switching element 13*i* from malfunctioning due to thermal energy, and to protect the first lower arm side switching element 13*i* from thermal energy.

The power conversion device having the power converter equipped with one or more the power modules 110 according to the ninth exemplary embodiment has the same behavior and effects of the power conversion device according to the first and third exemplary embodiments. Further, the structure of the power module 110 makes it possible to reduce the total number of the temperature sensitive diodes when compared with the comparative example previously explained. This makes it possible to reduce the manufacturing cost of the power conversion device. Still further, it is possible for the power module 110 to detect a temperature of the corresponding switching element with high accuracy when compared with the comparative example. Furthermore, the structure of the power module makes it possible to reduce the size of each switching element when compared with the comparative example, it is possible to reduce the manufacturing cost and to suppress reduction of an output of the power conversion device. The concept of the power conversion device according to the ninth exemplary embodiment can be applied to the power conversion device according to each of the first to eighth exemplary embodiments.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A power conversion device of motor vehicles, comprising a power converter which boosts a battery voltage supplied from a battery and supplies the boosted voltage to a motor mounted on a motor vehicle, wherein
   the power converter comprises an upper arm and a lower arm, the upper arm comprising a plurality of upper arm side switching elements, and the lower arm comprising a plurality of lower arm side switching elements, the plurality of upper arm side switching elements being directly connected to the respective plurality of lower arm side switching elements,
   wherein
   at least one of the plurality of upper arm side switching elements is composed of a metal oxide semiconductor field effect transistor (MOS FET), and at least one of the plurality of lower arm side switching elements is composed of an insulated gate bipolar transistor (IGBT).

2. The power conversion device of motor vehicles according to claim 1, further comprising a reactor accumulating electrical energy and supplying the electrical energy, one terminal of the reactor being connected to the battery, and the other terminal of the reactor being connected through a conductive member to a connection node between the upper arm side switching element and the lower arm side switching element, wherein
   the upper arm comprises the MOS FET and another type of a switching element, as one of the plurality of upper arm side switching elements, which is different in type from the MOS FET, and the MOS FET is arranged close to a location of the reactor when compared with location of the another type of the switching element.

3. The power conversion device of motor vehicles according to claim 1, further comprising a reactor accumulating electrical energy and supplying the electrical energy, one terminal of the reactor being connected to the battery, and the other terminal of the reactor being connected through a conductive member to a connection node between the upper arm side switching element and the lower arm side switching element, wherein
the upper arm comprises the MOS FET and another type of a switching element, as one of the plurality of upper arm side switching elements, which is different in type from the MOS FET, and the MOS FET is arranged far from a location of the reactor when compared with location of the another type of the switching element.

4. The power conversion device of motor vehicles according to claim 1, further comprising a control unit, wherein
the power converter comprises a plurality of pairs, each of the plurality of pairs comprises the upper arm side switching element and the lower arm side switching element which are connected in series, wherein
the upper arm comprises at least one MOS FET and at least one insulated gate bipolar transistor (IGBT) as the upper arm side switching elements, and
the control unit comprises a first drive part driving the MOS FET and a second drive part driving the IGBT.

5. The power conversion device of motor vehicles according to claim 2, further comprising a control unit, wherein
the power converter comprises a plurality of pairs, each of the plurality of pairs comprises the upper arm side switching element and the lower arm side switching element which are connected in series, wherein
the upper arm comprises at least one MOS FET and at least one insulated gate bipolar transistor (IGBT) as the upper arm side switching elements, and
the control unit comprises a first drive part driving the MOS FET and a second drive part driving the IGBT.

6. The power conversion device of motor vehicles according to claim 2, further comprising a control unit, wherein
the power converter comprises a plurality of pairs, each of the plurality of pairs comprises the upper arm side switching element and the lower arm side switching element which are connected in series, wherein
the upper arm comprises at least one MOS FET and at least one insulated gate bipolar transistor (IGBT) as the upper arm side switching elements, and
the control unit comprises a first drive part driving the MOS FET and a second drive part driving the IGBT.

7. The power conversion device of motor vehicles according to claim 1, wherein
the lower arm comprises a reverse-conducting insulated gate bipolar transistor (RC-IGBT) as the lower arm side switching element composed of the IGBT.

8. The power conversion device of motor vehicles according to claim 2, wherein
the lower arm comprises a reverse-conducting insulated gate bipolar transistor (RC-IGBT) as the lower arm side switching element composed of the IGBT.

9. The power conversion device of motor vehicles according to claim 3, wherein
the lower arm comprises a reverse-conducting insulated gate bipolar transistor (RC-IGBT) as the lower arm side switching element composed of the IGBT.

10. The power conversion device of motor vehicles according to claim 7, wherein
the MOS FET and the RC-IGBT are packaged together in a single casing.

11. The power conversion device of motor vehicles according to claim 8, wherein
the MOS FET and the RC-IGBT are packaged together in a single casing.

12. The power conversion device of motor vehicles according to claim 9, wherein
the MOS FET and the RC-IGBT are packaged together in a single casing.

13. The power conversion device of motor vehicles according to claim 1, wherein
at least one of the upper arm side switching elements is equipped with a temperature sensor.

14. The power conversion device of motor vehicles according to claim 2, wherein
at least one of the upper arm side switching elements is equipped with a temperature sensor.

15. The power conversion device of motor vehicles according to claim 3, wherein
at least one of the upper arm side switching elements is equipped with a temperature sensor.

16. The power conversion device of motor vehicles according to claim 1, wherein
the total number of the upper arm side switching elements forming the upper arm is lower than the total number of the lower arm side switching elements forming the lower arm.

17. The power conversion device of motor vehicles according to claim 2, wherein
the total number of the upper arm side switching elements forming the upper arm is lower than the total number of the lower arm side switching elements forming the lower arm.

18. The power conversion device of motor vehicles according to claim 3, wherein
the total number of the upper arm side switching elements forming the upper arm is lower than the total number of the lower arm side switching elements forming the lower arm.

* * * * *